(12) United States Patent
Kuo

(10) Patent No.: US 12,117,688 B2
(45) Date of Patent: Oct. 15, 2024

(54) DISPLAY APPARATUS

(71) Applicant: Au Optronics Corporation, Hsinchu (TW)

(72) Inventor: Yu-Pin Kuo, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 428 days.

(21) Appl. No.: 17/515,567

(22) Filed: Nov. 1, 2021

(65) Prior Publication Data
US 2023/0056290 A1    Feb. 23, 2023

(30) Foreign Application Priority Data

Aug. 19, 2021    (TW) .................................. 110130634

(51) Int. Cl.
*G02F 1/1335*    (2006.01)
*G02F 1/1339*    (2006.01)
(Continued)

(52) U.S. Cl.
CPC .... *G02F 1/133526* (2013.01); *G02F 1/13394* (2013.01); *G02F 1/167* (2013.01);
(Continued)

(58) Field of Classification Search
CPC ........ G02B 27/0172; G02B 2027/0178; G02B 2027/0118; G02B 3/14; G02B 27/0176; G02B 2027/0105; G02B 2027/0174; G02B 26/0833; G02B 26/101; G02B 27/017; G02B 27/283; G02B 30/27; G02B 26/005;
(Continued)

(56) References Cited

U.S. PATENT DOCUMENTS 9,785,006 B2    10/2017    Shinkai et al.
2011/0013102 A1*    1/2011    Miyazaki .......... G02F 1/133526
349/5
(Continued)

FOREIGN PATENT DOCUMENTS

CN    203337950    12/2013
CN    105911691    8/2016
(Continued)

*Primary Examiner* — Brandi N Thomas
(74) *Attorney, Agent, or Firm* — JCIPRNET

(57) ABSTRACT

A display apparatus including a first substrate, a first electrode, a second substrate, a first microlens layer, a second microlens layer, a second electrode, a blocking wall structure, an electrophoresis medium, and multiple particles. The first electrode is disposed on the first substrate. The first microlens layer, having multiple first microlenses, is disposed on the second substrate. The second microlens layer, having multiple second microlenses, is disposed on the first microlens layer. The second electrode is disposed on the second microlens layer. The blocking wall structure is at least disposed between the first electrode and the second electrode and has an accommodating space corresponding to the first electrode. The electrophoresis medium is disposed in the accommodating space. The first microlens layer and the second microlens layer are disposed between the second substrate and at least a portion of the electrophoresis medium. The particles are mixed within the electrophoresis medium.

14 Claims, 12 Drawing Sheets

(51) Int. Cl.
  *G02F 1/167* (2019.01)
  *G02F 1/1676* (2019.01)
  *G02F 1/1677* (2019.01)
  *G02F 1/1679* (2019.01)
  *G02F 1/16756* (2019.01)

(52) U.S. Cl.
  CPC .......... *G02F 1/1676* (2019.01); *G02F 1/1677* (2019.01); *G02F 1/1679* (2019.01); *G02F 1/16756* (2019.01)

(58) Field of Classification Search
  CPC .... G02B 3/08; G02B 2027/0158; G02B 3/12; G02B 30/28; G02B 30/29; G02B 5/003; G02B 1/06; G02B 2027/0123; G02B 2027/0127; G02B 2027/0132; G02B 2027/0152; G02B 2027/0187; G02B 26/004; G02B 27/0075; G02B 27/0961; G02B 30/56; G02B 5/18; G02B 6/26; G02B 7/04; G02B 26/0825; G02B 26/0875; G02B 3/0006; G02B 3/0043; G02B 6/005; G02F 1/167; G02F 1/134309; G02F 1/29; G02F 1/133526; G02F 1/13394; G02F 1/133742; G02F 1/133788; G02F 1/137; G02F 2201/44; G02F 1/13; G02F 1/13312; G02F 1/13338; G02F 1/133512; G02F 1/16756; G02F 1/1676; G02F 1/1677; G02F 1/1679; G02F 1/294; G02F 1/133616; G02F 1/16766; G02F 1/1681; G02F 2203/02; G02F 1/133302; G02F 1/13334; G02F 1/133502; G02F 1/13439; G02F 1/136227; G02F 1/166; G02F 1/292; G02F 1/13318; G02F 1/133345; G02F 1/133524; G02F 1/133553; G02F 1/133607; G02F 1/13624; G02F 1/1533; G02F 1/163; G02F 2201/123
  See application file for complete search history.

(56) References Cited

U.S. PATENT DOCUMENTS

2015/0293402 A1    10/2015  Shinkai et al.
2016/0018568 A1*    1/2016  Ito ........................ G02B 3/0068
                                                                    359/793
2018/0286904 A1*   10/2018  Tazoe ................ H01L 27/14621

FOREIGN PATENT DOCUMENTS

CN      104508546     5/2017
CN      108169921     6/2018
JP      2003177396    6/2003

* cited by examiner

DISPLAY APPARATUS

CROSS-REFERENCE TO RELATED APPLICATION

This application claims the priority benefit of Taiwan application serial no. 110130634, filed on Aug. 19, 2021. The entirety of the above-mentioned patent application is hereby incorporated by reference herein and made a part of this specification.

BACKGROUND

Technical Field

The disclosure relates to an optoelectronic apparatus, and in particular to a display apparatus.

Description of Related Art

A reflective display apparatus includes a first substrate, multiple first electrodes disposed on the first substrate, a second substrate disposed opposite to the first substrate, multiple optical microstructure layers disposed on the second substrate, multiple second electrodes disposed on multiple optical microstructures, and a blocking wall structure disposed between the first substrate and the second substrate. The blocking wall structure has an accommodating space, and an electrophoresis medium and multiple particles are disposed in the accommodating space of the blocking wall structure. The particles in the accommodating space are adapted for moving towards or away from the optical microstructure layer under the action of the electric field between the first electrode and the second electrode.

When the particles are close to the optical microstructure layer, the light beam incident from outside the second substrate may be absorbed and/or scattered by the particles, so that a pixel region is in a dark state. When the particles are away from the optical microstructure layer, due to the disposition of the optical microstructure layer, the light beam incident from the second substrate is totally reflected at at least one interface between the optical microstructure layer and the electrophoresis medium, so that the pixel region is in a bright state. However, the light beam incident from outside the second substrate is not totally reflected in all regions of the optical microstructure layer, resulting in low reflectance of the reflective display apparatus.

SUMMARY

The disclosure provides a display apparatus with high reflectance.

A display apparatus of the disclosure includes a first substrate, a first electrode, a second substrate, a first microlens layer, a second microlens layer, a second electrode, a blocking wall structure, an electrophoresis medium, and multiple particles. The first electrode is disposed on the first substrate. The second substrate is disposed opposite to the first substrate. The first microlens layer is disposed on the second substrate, and has multiple first microlenses. The second microlens layer is disposed on the first microlenses layer, and has multiple second microlenses. The second electrode is disposed on the second microlens layer. The blocking wall structure is at least disposed between the first electrode and the second electrode, and has an accommodating space corresponding to the first electrode. The electrophoresis medium is disposed in accommodating space. The first microlens layer and the second microlens layer are disposed between the second substrate and at least one portion of the electrophoresis medium. The particles are mixed within the electrophoresis medium.

In an embodiment of the disclosure, a portion of a light beam passes through the second substrate and the first microlens layer in sequence, is reflected by at least one interface between the second microlens layer and the electrophoresis medium, and passes through the first microlens layer and the second substrate.

In an embodiment of the disclosure, one of the first microlenses as described above has a first convex surface protruding toward the first substrate, one of the second microlenses has a second convex surface protruding toward the first substrate, and the first convex surface is located between the second substrate and the second convex surface.

In an embodiment of the disclosure, one of the second microlenses as described above at least overlaps a first gap between the first microlenses.

In an embodiment of the disclosure, one of the first microlenses as described above at least overlaps a second gap between the second microlenses.

In an embodiment of the disclosure, the display apparatus as described above further includes multiple spacers and a porous film. The spacers are disposed on the first microlens layer. The porous film is disposed on the spacers. The second microlens layer is disposed on the porous film.

In an embodiment of the disclosure, the display apparatus as described above includes a third electrode, a first insulating layer, and a second insulating layer. The third electrode is disposed on the first microlens layer. The first insulating layer is disposed on the third electrode. The spacers are disposed on the first insulating layer. The second insulating layer is disposed on the second electrode. The second electrode is located between the second microlens layer and the second insulating layer.

In an embodiment of the disclosure, each of the first microlenses as described above includes a central portion having a vertex; the second microlenses of the second microlens layer respectively overlap the central portions of the first microlenses.

In an embodiment of the disclosure, one of the first microlenses as described above has a first convex surface protruding toward the first substrate, one of the second microlenses has a second convex surface protruding toward the first substrate, and a radius of curvature of the second convex surface is smaller than a radius of curvature of the first convex surface.

In an embodiment of the disclosure, the second microlens layer as described above is directly disposed on the first microlens layer.

DESCRIPTION OF THE EMBODIMENTS

Figure 1:
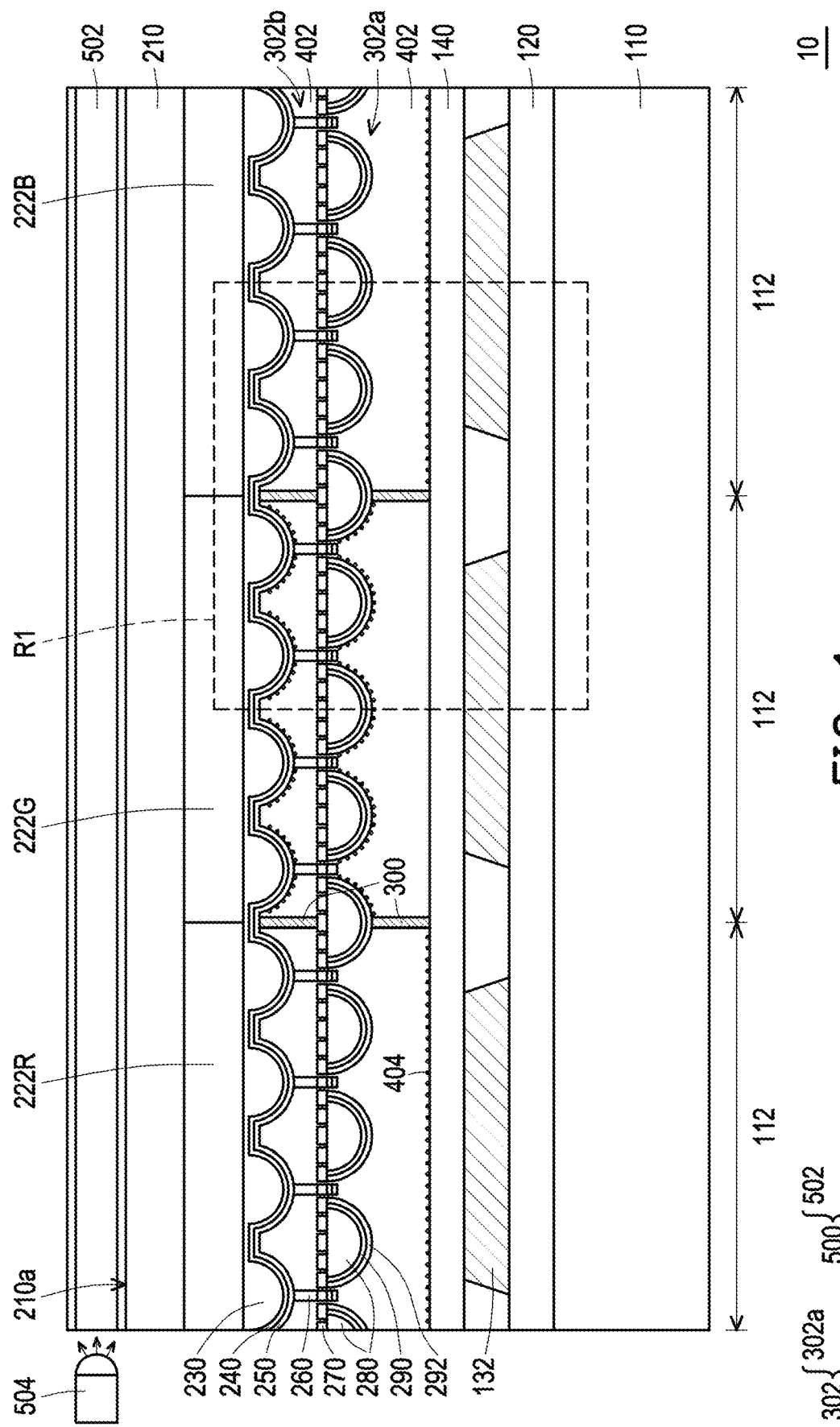
FIG. 1 is a schematic cross-sectional view of a display apparatus 10 according to the first embodiment of the disclosure.

Now, reference will be made to the exemplary embodiment of the disclosure in detail, and examples of the exemplary embodiment are illustrated in the accompanying drawings. Whenever possible, the same reference numerals are used in the drawings and descriptions to indicate the same or similar parts.

It should be understood that when an element such as a layer, film, region or substrate is referred to as being "on" or "connected" to another element, the element may be directly on or connected to said another element, or an intermediate element may further exist. In contrast, when an element is referred to as being "directly on another element" or "directly connected to" another element, there is no intermediate element. As used herein, "connected" may refer to physical and/or electrical connection. Furthermore, "electrical connection" or "coupling" may mean that there are other elements between two elements.

As used herein, "about", "approximately", or "substantially" includes the stated value and the average value within an acceptable range of deviation from a specific value determined by a person of ordinary skill in the art, taking into account the measurement in question and the specific amount (for example, the limit of the measurement system) of errors associated with the measurement. For example, "about" may mean within one or more standard deviations of the stated value, or within ±30%, ±20%, ±10%, ±5%. Furthermore, regarding "about", "approximately" or "substantially" as used herein, a more acceptable deviation range or standard deviation may be selected based on optical properties, etching properties or other properties, and it is possible that one standard deviation may not be used for all properties.

Unless otherwise defined, all terms (including technical and scientific terms) used herein have the same meaning as commonly understood by those of ordinary skill in the art to which the disclosure belongs. It will be further understood that terms such as those defined in commonly used dictionaries should be interpreted as having a meaning consistent with their meaning in the context of the related art and the disclosure, and will not be interpreted as an idealized or excessive formal meaning, unless explicitly defined as such herein.

FIG. 1 is a schematic cross-sectional view of a display apparatus 10 according to the first embodiment of the disclosure.

Figure 2:
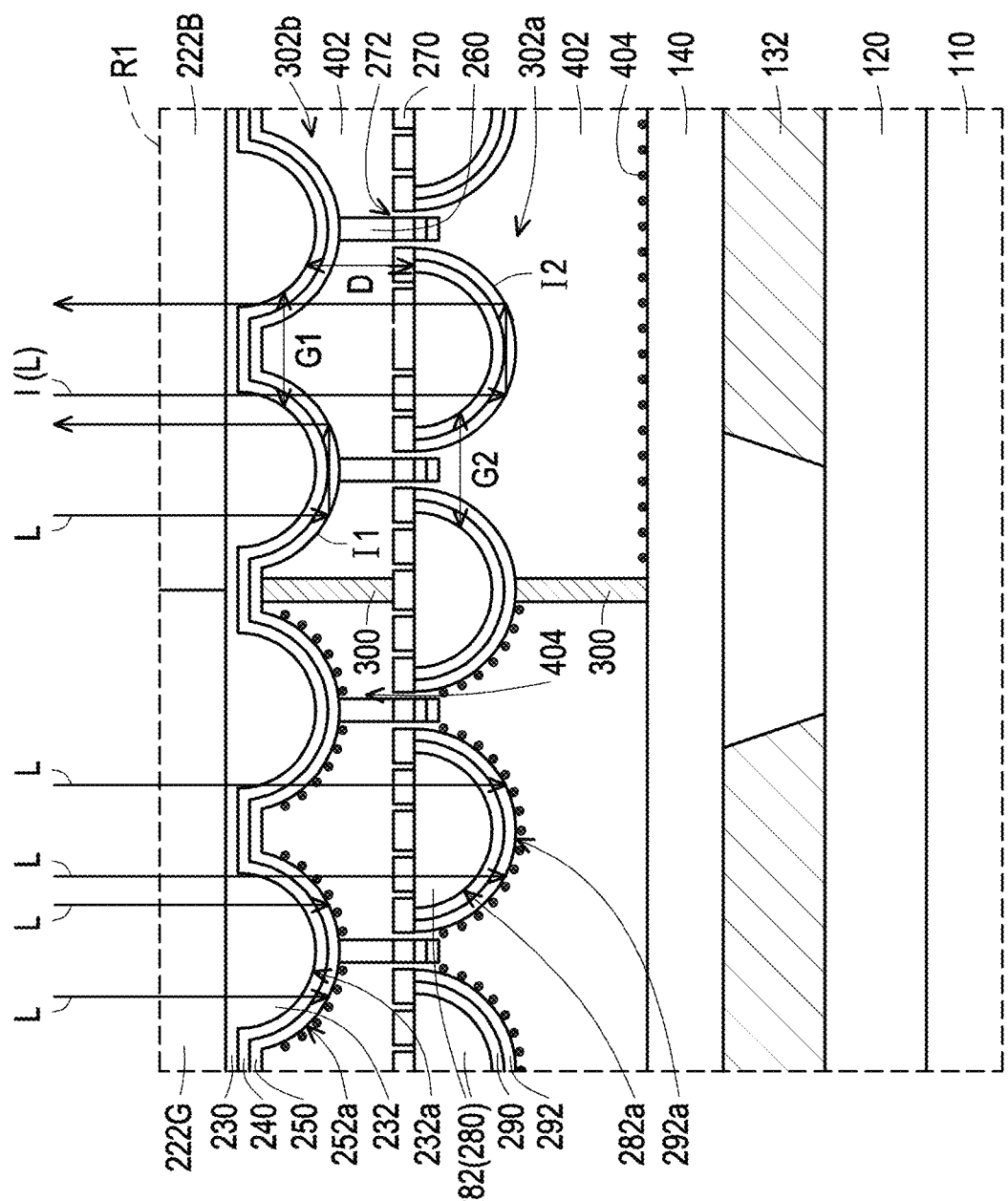
FIG. 2 is an enlarged schematic view of a portion of the display apparatus 10 of the first embodiment of the disclosure.

FIG. 2 is an enlarged schematic view of a portion of the display apparatus 10 of the first embodiment of the disclosure. FIG. 2 corresponds to a region R1 of FIG. 1.

Referring to FIGS. 1 and 2, the display apparatus 10 includes a first substrate 110 having a plurality of pixel regions 112. For example, in this embodiment, the material of the first substrate 110 may be glass, quartz, an organic polymer, an opaque/reflective material, or other applicable materials.

The display apparatus 10 further includes a plurality of first electrodes 132, which are respectively disposed on the plurality of pixel regions 112 of the first substrate 110. The plurality of first electrodes 132 may be regarded as a plurality of pixel electrodes of the display apparatus 10. In this embodiment, the display apparatus 10 may further selectively include an active element layer 120, and the active element layer 120 has a plurality of pixel driving circuits (not shown), which are respectively electrically connected to the plurality of first electrodes 132. For example, in this embodiment, each pixel driving circuit may include a thin film transistor with first, second, and control terminals (not shown), a data line (not shown), and a scanning line (not shown). The first terminal of the thin film transistor is electrically connected to the data line, the control terminal of the thin film transistor is electrically connected to the scanning line, and the second terminal of the thin film transistor is electrically connected to one corresponding first electrode 132, but the disclosure is not limited thereto.

In addition, in this embodiment, the display apparatus 10 may further include at least one dielectric layer 140 disposed on the first electrodes 132 to prevent water vapor from invading the element below it.

The display apparatus 10 further includes a second substrate 210, which is disposed opposite to the first substrate 110. The second substrate 210 is a light-transmitting substrate. For example, in this embodiment, the material of the second substrate 210 may be glass, quartz, an organic polymer, or other applicable materials.

The display apparatus 10 further includes a first microlens layer 230, which is disposed on the second substrate 210 and has a plurality of first microlenses 232. The first microlens layer 230 is located between the first substrate 110 and the second substrate 210. In this embodiment, the first microlens 232 has a first convex surface 232a protruding toward the first substrate 110 (marked in FIG. 2). For example, in this embodiment, the first microlens 232 may selectively include a hemispherical first solid structure, and the hemispherical surface of the first solid structure faces the first substrate 110. However, the disclosure is not limited thereto. In other embodiments, the first microlens 232 may be other optical structures that may guide a light beam L (marked in FIG. 2) back to the second substrate 210.

The display apparatus 10 further includes a second microlens layer 280, which is disposed on the first microlens layer 230 and has a plurality of second microlenses 282. The second microlens layer 280 is located between the first microlens layer 230 and the first substrate 110. In this embodiment, the second microlens 282 has a second convex surface 282a (marked in FIG. 2) protruding toward the first substrate 110, and the first convex surface 232a of the first microlens 232 is located between the second substrate 210 and the second convex surface 282a of the second microlens 282. For example, in this embodiment, the second microlens 282 may selectively include a hemispherical second solid structure, and the hemispherical surface of the second solid structure faces the first substrate 110. However, the disclosure is not limited thereto. In other embodiments, the second microlens 282 may be other optical structures that may guide the light beam L back to the second substrate 210.

In this embodiment, the display apparatus 10 may selectively include a plurality of color filter patterns 222R, 222G, and 222B, which are disposed between the second substrate 210 and the first microlens layer 230 and are respectively located above the plurality of first electrodes 132. For example, in this embodiment, the plurality of color filter patterns 222R, 222G, and 222B may include a red filter pattern, a green filter pattern, and a blue filter pattern respectively disposed on different pixel regions 112, but the disclosure is not limited thereto.

The display apparatus 10 further includes a second electrode 290, which is disposed on the second microlens layer 280. The second microlens layer 280 is located between the first microlens layer 230 and the second electrode 290. The second electrode 290 is a light-transmitting electrode. The second electrode 290 overlaps the plurality of pixel regions 112 of the first substrate 110, and may be regarded as a common electrode of the display apparatus 10. In this embodiment, the second electrode 290 may be conformally disposed on a plurality of second microlenses 282 on a plurality of second convex surface 282a.

In this embodiment, the display apparatus 10 further includes a second insulating layer 292. The second insulating layer 292 is disposed on the second electrode 290, and the second electrode 290 is located between the second microlens layer 280 and the second insulating layer 292. In this embodiment, the second insulating layer 292 may be conformally disposed on the second electrode 290 and have a second insulating convex surface 292a (marked in FIG. 2) corresponding to the second convex surface 282a of the second microlens 282.

In this embodiment, the display apparatus 10 may selectively include a plurality of spacers 260 and a porous film 270. The plurality of spacers 260 are disposed on the first microlens layer 230. The porous film 270 is disposed on the plurality of spacers 260. The second microlens layer 280 is disposed on the porous film 270. In this embodiment, the porous film 270 and the plurality of spacers 260 may be disposed between the first microlens layer 230 and the second microlens layer 280, so that a fixed distance D is maintained between the first microlens layer 230 and the second microlens layer 280. The porous film 270 has a plurality of vias 272, which are adapted for allowing a particle 404 to pass through.

In this embodiment, the display apparatus 10 may selectively include a third electrode 240. The third electrode 240 is disposed on the first microlens layer 230. The third electrode 240 is located between the first microlens layer 230 and the plurality of spacers 260. The third electrode 240 is a light-transmitting electrode. The third electrode 240 overlaps the plurality of pixel regions 112 of the first substrate 110, and may be regarded as another common electrode of the display apparatus 10. In this embodiment, the third electrode 240 and the second electrode 290 respectively disposed on the first microlens layer 230 and the second microlens layer 280 may be electrically connected to each other, and substantially have the same potential. In addition, in this embodiment, the third electrode 240 may be conformally disposed on the plurality of first convex surfaces 232a (marked in FIG. 2) of the plurality of first microlenses 232.

In this embodiment, the display apparatus 10 may selectively include a first insulating layer 250. The first insulating layer 250 is disposed on the third electrode 240. The plurality of spacers 260 are disposed on the first insulating layer 250. The first insulating layer 250 is located between the third electrode 240 and the plurality of spacers 260. In this embodiment, at least one portion of the first insulating layer 250 may be conformally disposed on the third electrode 240, and have a first insulating convex surface 252a (marked in FIG. 2) corresponding to the first convex surface 232a of the first microlens 232.

The display apparatus 10 further includes a blocking wall structure 300, an electrophoresis medium 402, and a plurality of particles 404. The blocking wall structure 300 is at least disposed between the first electrode 132 and the second electrode 290, and has a plurality of accommodating spaces 302 respectively corresponding to the plurality of first electrodes 132. The electrophoresis medium 402 is disposed in the plurality of accommodating space 302 of the blocking wall structure 300. The first microlens layer 230 and the second microlens layer 280 are disposed between the second substrate 210 and at least one portion of the electrophoresis medium 402. The plurality of particles 404 are mixed within the electrophoresis medium 402. The plurality of particles 404 may absorb light and/or scatter light.

For example, in this embodiment, in addition to being disposed between the first electrode 132 and the second electrode 290, the blocking wall structure 300 may further be selectively disposed between the third electrode 240 and the porous film 270; in addition to a main portion 302a between the first electrode 132 and the second electrode 290, the accommodating space 302 of the blocking wall structure 300 may further include a minor portion 302b between the third electrode 240 and the porous film 270. In this embodiment, the electrophoresis medium 402 may fill the main portion 302a of the accommodating space 302, the minor portion 302b of the accommodating space 302 of the blocking wall structure 300, and the via 272 of the porous film 270. The particle 404 may bounce in the main portion 302a of the accommodating space 302, the via 272 of the porous film 270, and the minor portion 302b of the accommodating space 302.

The particle 404 is charged. The plurality of particles 404 in each accommodating space 302 are adapted for moving toward or away from the first microlens layer 230 and the second microlens layer 280 under the action of an electric field between the corresponding first electrode 132 and second electrode 290. In this way, the pixel region 112 may be in a bright state or a dark state.

For example, in this embodiment, to allow one pixel region 112 (for example: the pixel region 112 on the right side of FIG. 2) to be in a bright state, a forward bias may exist between the first electrode 132 on the pixel region 112 and the second electrode 290, and a forward bias may further exist between the first electrode 132 and the third electrode 240 on the pixel region 112, so that the charged particle 404 moves toward the first electrode 132, and then is disposed on the first electrode 132. At this time, the first microlens layer 230 is adjacent to the electrophoresis medium 402, which has a refractive index substantially different from that of the first microlens layer 230, instead of adjacent to the particle 404. The second microlens layer 280 is also adjacent to the electrophoresis medium 402, which has a refractive index substantially different from that of the second microlens layer 280, instead of adjacent to the particle 404. At least one portion of the light beam L incident from the second substrate 210 is totally reflected by at least one interface I1 (marked in FIG. 2) between the plurality of first microlenses 232 and the electrophoresis medium 402 and at least one interface I2 (marked in FIG. 2) between the plurality of second microlenses 282 and the electrophoresis medium 402, and the observer may observe that the pixel region 112 is in a bright state.

For example, in this embodiment, to allow one pixel region 112 (for example: the pixel region 112 on the left side of FIG. 2) to be in a dark state, a reverse bias may exist between the first electrode 132 on the pixel region 112 and the second electrode 290, and a reverse bias may also exist between the first electrode 132 on the pixel region 112 and the third electrode 240, so that the charged electrophoretic particle 404 moves toward the third electrode 240 and the second electrode 290 on the first microlens layer 230 and the second microlens layer 280, and then is disposed on the first convex surface 232a of the first microlens 232 and the second convex surface 282a of the second microlens 282. At this time, the light beam L incident from the second substrate 210 is absorbed and/or scattered by the plurality of particles 404 after passing through the first microlens 232 and/or the second microlens 282, and the observer may observe that the pixel region 112 is in a dark state.

It is worth mentioning that in the pixel region 112 that is to be in a bright state (for example: the pixel region 112 on the right side of FIG. 2), a portion 1 of the light beam L is not totally reflected by the at least one interface I1 between the first microlens layer 230 and the electrophoresis medium 402 after passing through the second substrate 210 and the first microlens layer 230 in sequence. Through disposing the second microlens layer 280, the portion 1 of the light beam L may be sequentially reflected by the at least one interface I2 between the second microlens layer 280 and the electrophoresis medium 402, pass through the first microlens layer 230 and the second substrate 210, and then be transmitted to the eyes of the observer. In this way, the portion 1 of the light beam L that is not guided back to the outside of the second substrate 210 by the first microlens layer 230 may be guided back to the outside of the second substrate 210 by the second microlens layer 280, thereby increasing the reflectance of the display apparatus 10.

For example, in this embodiment, the second microlens 282 may at least overlap a first gap G1 (marked in FIG. 2) between the plurality of first microlenses 232, the first microlens 232 at least overlaps a second gap G2 (marked in FIG. 2) between the plurality of second microlenses 282. When the portion 1 of the light beam L passes through the first gap G1 between the plurality of first microlenses 232 and is not reflected by the at least one interface I1 between the first microlens layer 230 and the electrophoresis medium 402, the second microlens 282 of the second microlens layer 280 may make up for the deficiency of the first microlens layer 230, so that the portion 1 of the light beam L is reflected by the at least one interface I2 between the second microlens 282 and the electrophoresis medium 402, thereby improving the reflectance of the display apparatus 10.

In addition, in this embodiment, the display apparatus 10 may further selectively include a supplementary light source 500 (shown in FIG. 1), which is disposed on the external surface 210a of the second substrate 210. When the ambient light is insufficient, the supplementary light source 500 may be turned on to provide the light beam L incident from outside the second substrate 210, thereby improving the display effect of the display apparatus 10. For example, in this embodiment, the supplementary light source 500 may include a light guide plate 502 disposed on the external surface 210a of the second substrate 210 and a light emitting element 504 disposed on a side 502a of the light guide plate 502, but the disclosure is not limited thereto.

It must be noted that in the following embodiment, the reference numerals and a portion of the content of the aforementioned embodiment are used, the same reference numerals are used to represent the same or similar elements, and the description of the same technical content is omitted. The aforementioned embodiment may be referred to for the description of the omitted portions, which will not be repeated in the following embodiment.

Figure 3:
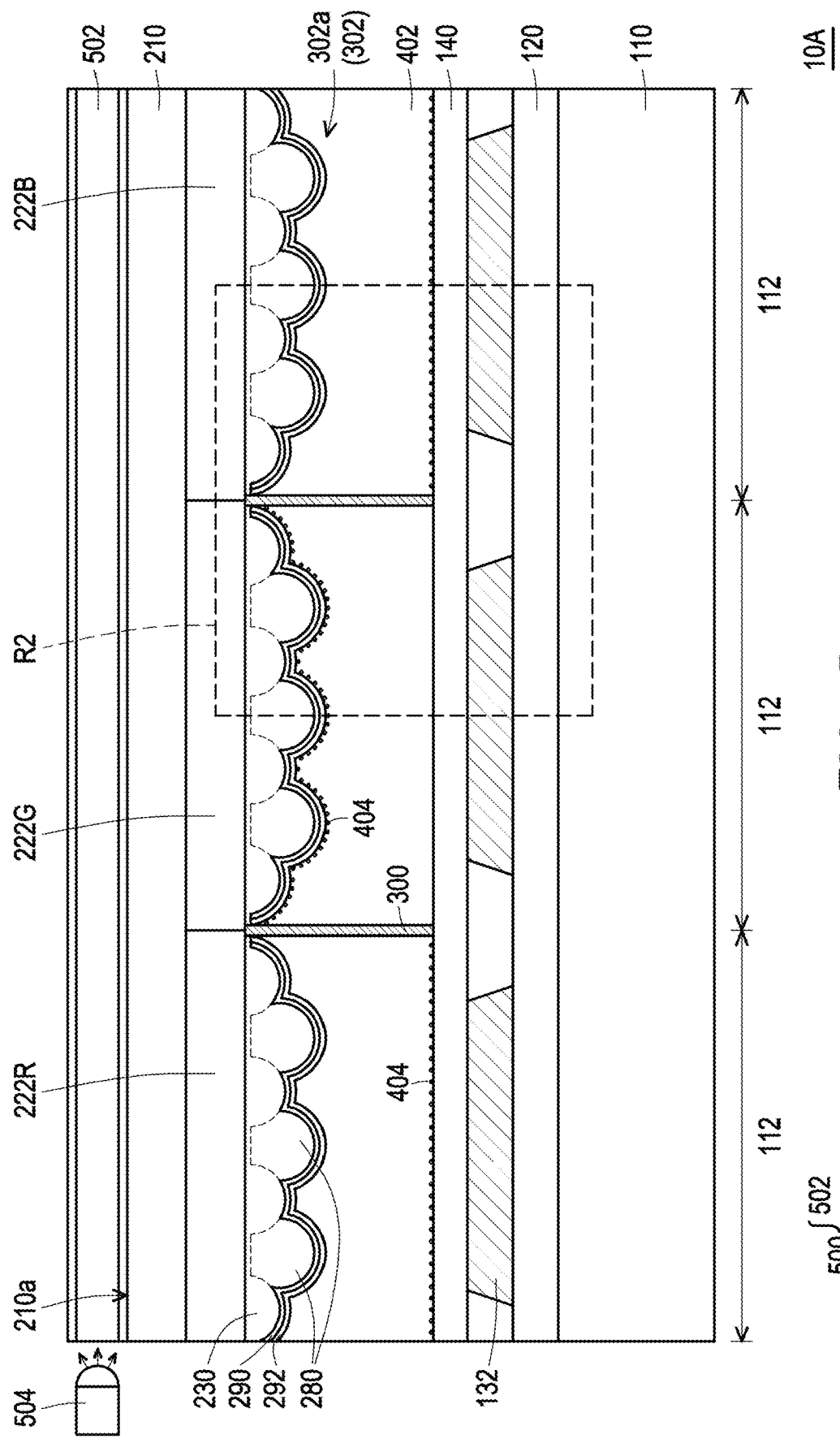
FIG. 3 is a schematic cross-sectional view of a display apparatus 10A according to the second embodiment of the disclosure.

FIG. 3 is a schematic cross-sectional view of the display apparatus 10A according to the second embodiment of the disclosure.

Figure 4:
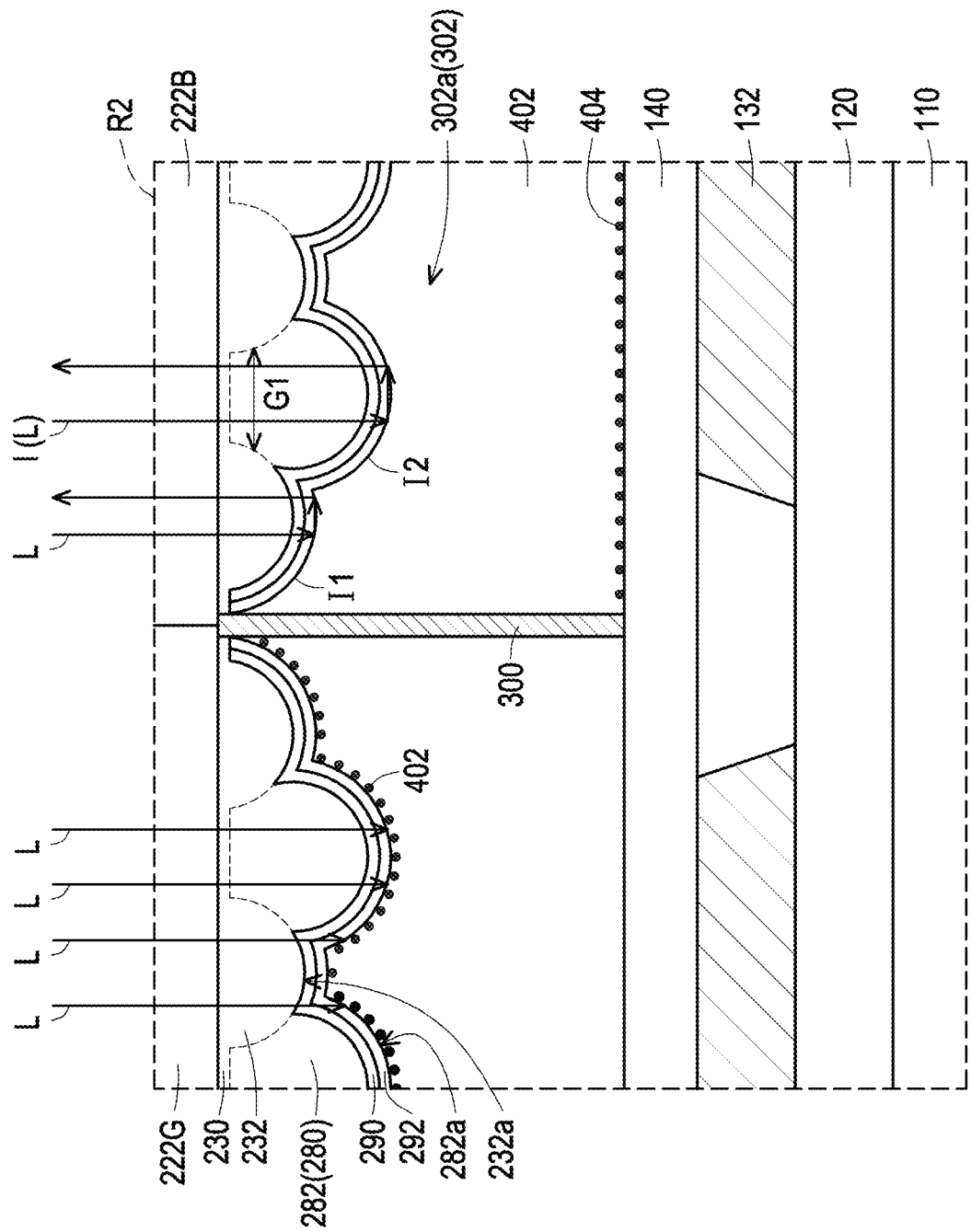
FIG. 4 is an enlarged schematic view of a portion of the display apparatus 10A according to the second embodiment of the disclosure.

FIG. 4 is an enlarged schematic view of a portion of the display apparatus 10A according to the second embodiment of the disclosure. FIG. 4 corresponds to a region R2 of FIG. 3.

Figure 5:
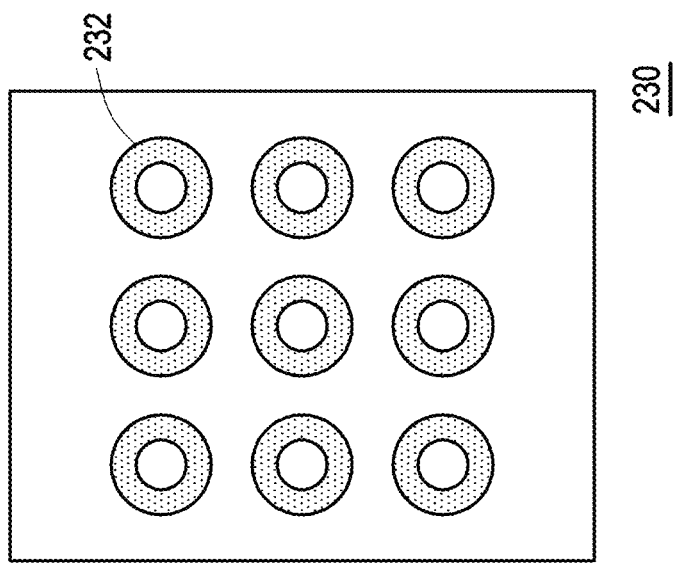
FIG. 5 is a top schematic view of a plurality of first microlenses 232 of FIG. 3.

FIG. 5 is a top schematic view of the plurality of first microlenses 232 of FIG. 3.

Figure 6:
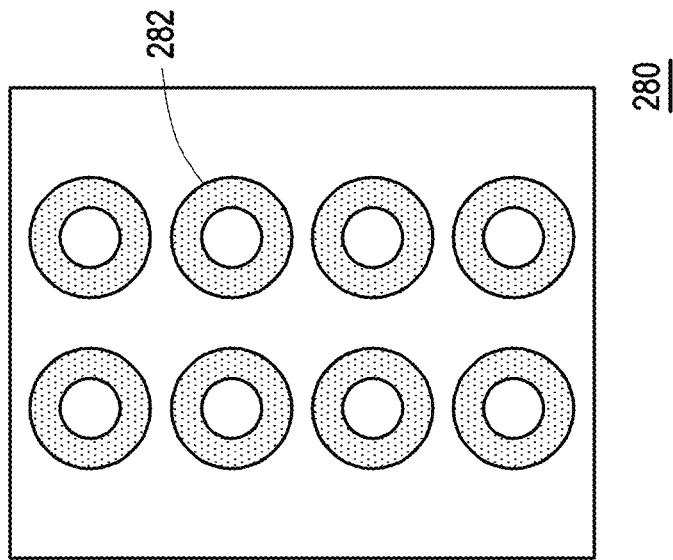
FIG. 6 is a top schematic view of a plurality of second microlenses 282 of FIG. 3.

FIG. 6 is a top schematic view of the plurality of second microlenses 282 of FIG. 3.

Figure 7:
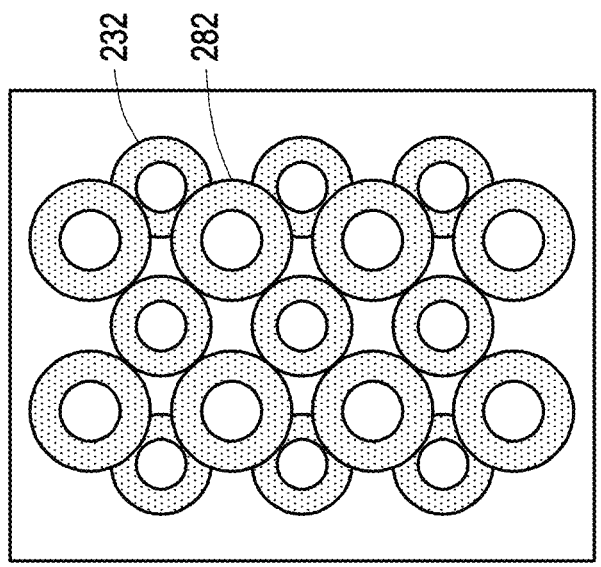
FIG. 7 is a top schematic view of a plurality of first microlenses 232 and a plurality of second microlenses 282 of FIG. 3.

FIG. 7 is a top schematic view of the plurality of first microlenses 232 and the plurality of second microlenses 282 of FIG. 3.

The display apparatus 10A of the second embodiment is similar to the display apparatus 10 of the first embodiment. The difference between the two is: in the display apparatus 10A of this embodiment, the second microlens layer 280 may be directly disposed on the first microlens layer 230.

Referring to FIGS. 3 to 7, in this embodiment, the second microlens layer 280 may be directly formed on the first microlens layer 230, and the second electrode 290 is disposed on a portion of the second convex surface 282a (marked in FIG. 4) of the second microlens 282 and the first convex surface 232a (marked in FIG. 4) of the first microlens 232. The display apparatus 10A of the embodiment does not need the spacer 260, the porous film 270, the first insulating layer 250, and the third electrode 240 of the display apparatus 10 of the first embodiment.

Referring to FIG. 4, similarly, in this embodiment, to allow one pixel region 112 (for example: the pixel region 112 on the right side of FIG. 4) to be in a bright state, a forward bias may exist between the first electrode 132 on the pixel region 112 and the second electrode 290, so that the charged particle 404 moves toward the first electrode 132, and then is disposed on the first electrode 132. At this time, the first microlens layer 230 and the second microlens layer 280 are adjacent to the electrophoresis medium 402, which has a refractive index substantially different from that of the first microlens layer 230 and the second microlens layer 280, instead of adjacent to the particle 404. At least one portion of the light beam L incident from the second substrate 210 is totally reflected by the at least one interface I1 between the plurality of first microlenses 232 and the electrophoresis medium 402 and the at least one interface I2 between the plurality of second microlenses 282 and the electrophoresis medium 402, and the observer may observe that the pixel region 112 is in a bright state.

In this embodiment, if one pixel region 112 (for example: the pixel region 112 on the left side of FIG. 4) is to be in a dark state, a reverse bias may exist between the first electrode 132 on the pixel region 112 and the second electrode 290, so that the charged particle 404 moves toward the second electrode 290 on the first microlens layer 230 and the second microlens layer 280, and then is disposed on a portion of the first convex surface 232a of the first microlens 232 and on the second convex surface 282a of the second microlens 282. At this time, the light beam L incident from the second substrate 210 is absorbed and/or scattered by the plurality of particles 404 after passing through the first microlens 232 and/or the second microlens 282, and the observer may observe that the pixel region 112 is in a dark state.

Figure 8:
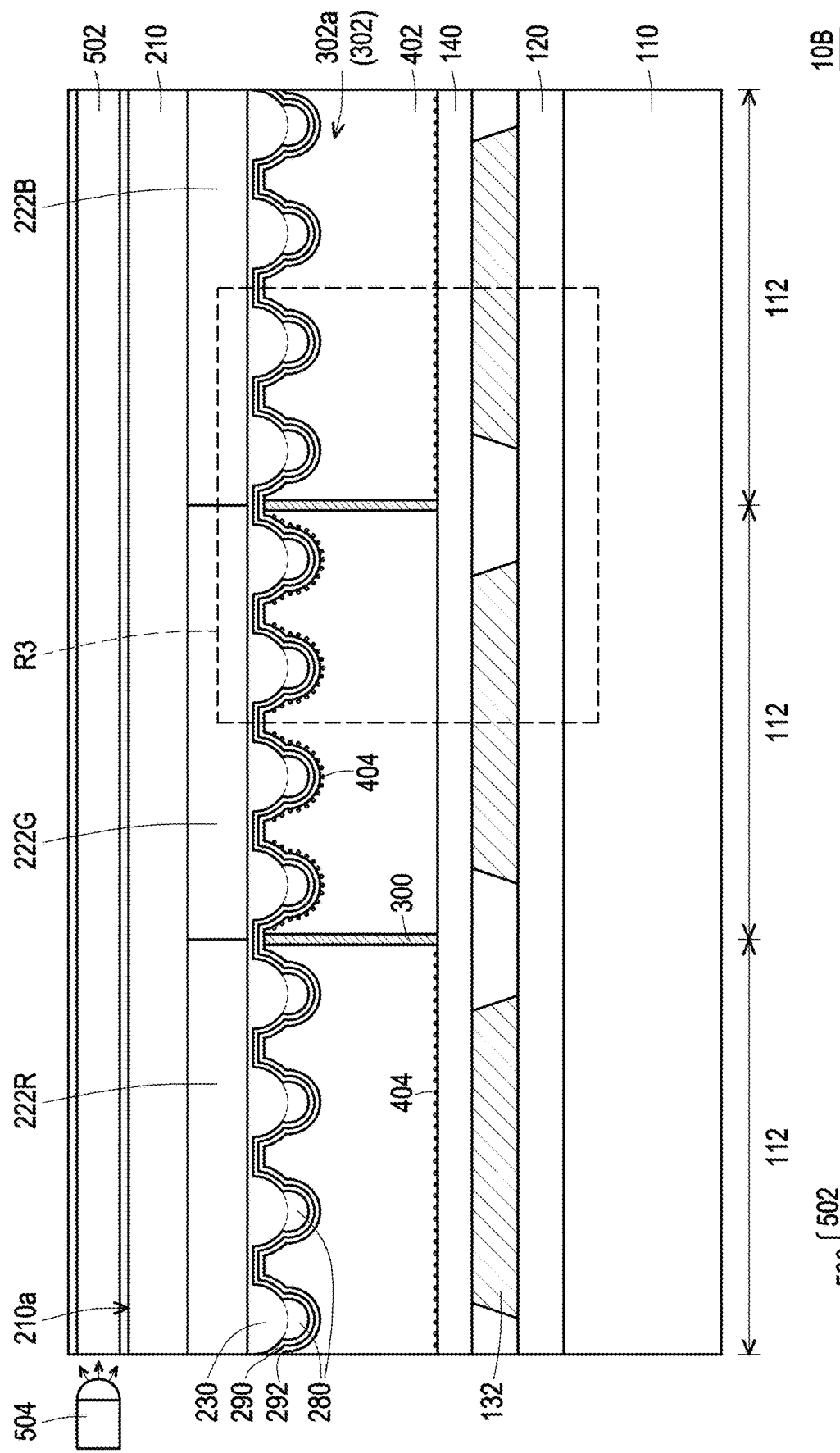
FIG. 8 is a schematic cross-sectional view of a display apparatus 10B according to the third embodiment of the disclosure.

FIG. 8 is a schematic cross-sectional view of the display apparatus 10B according to the third embodiment of the disclosure.

Figure 9:
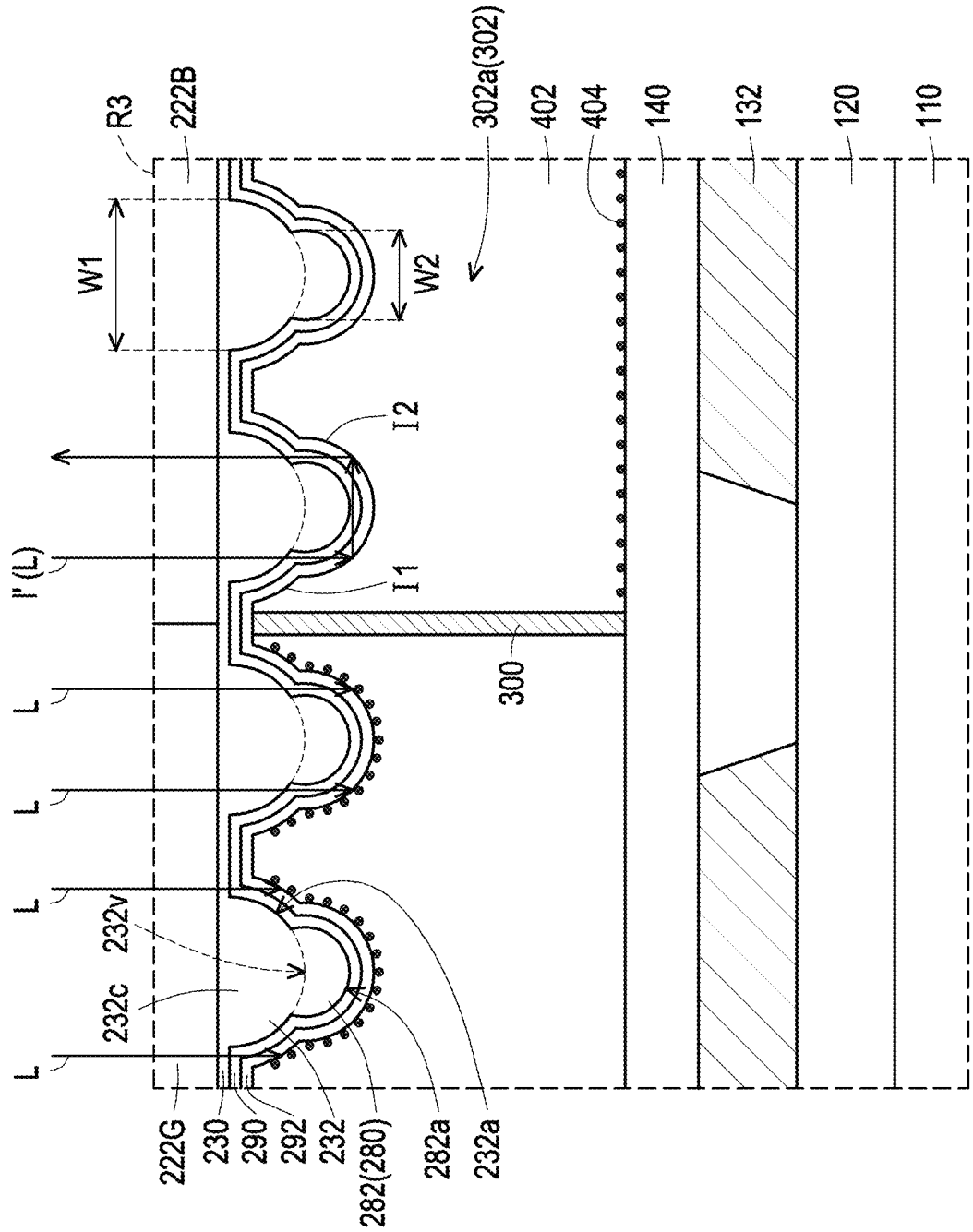
FIG. 9 is an enlarged schematic view of a portion of the display apparatus 10B according to the third embodiment of the disclosure.

FIG. 9 is an enlarged schematic view of a portion of the display apparatus 10B according to the third embodiment of the disclosure. FIG. 9 corresponds to a region R3 of FIG. 8.

Figure 10:
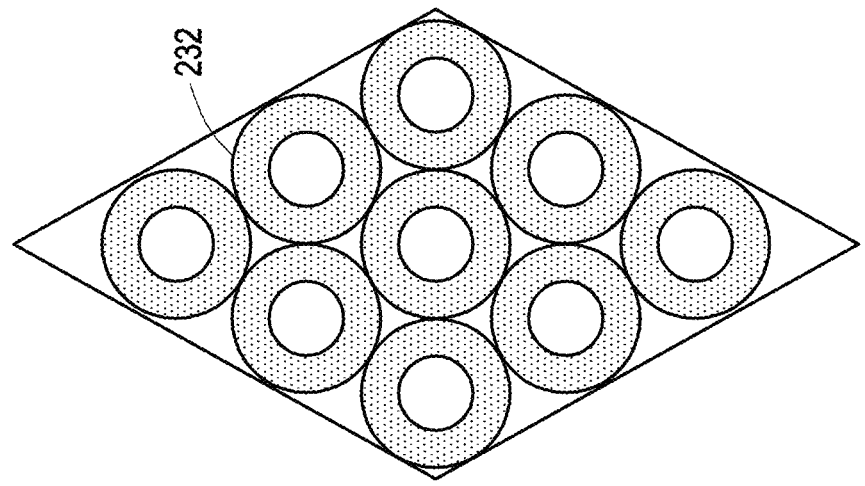
FIG. 10 is a top schematic view of a plurality of first microlenses 232 of FIG. 8.

FIG. 10 is a top schematic view of the plurality of first microlenses 232 of FIG. 8.

Figure 11:
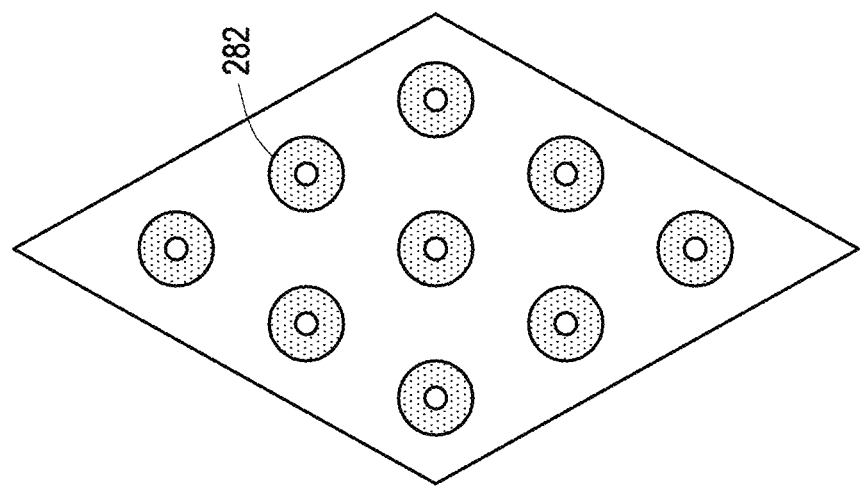
FIG. 11 is a top schematic view of a plurality of second microlenses 282 of FIG. 8.

FIG. 11 is a top schematic view of the plurality of second microlenses 282 of FIG. 8.

Figure 12:
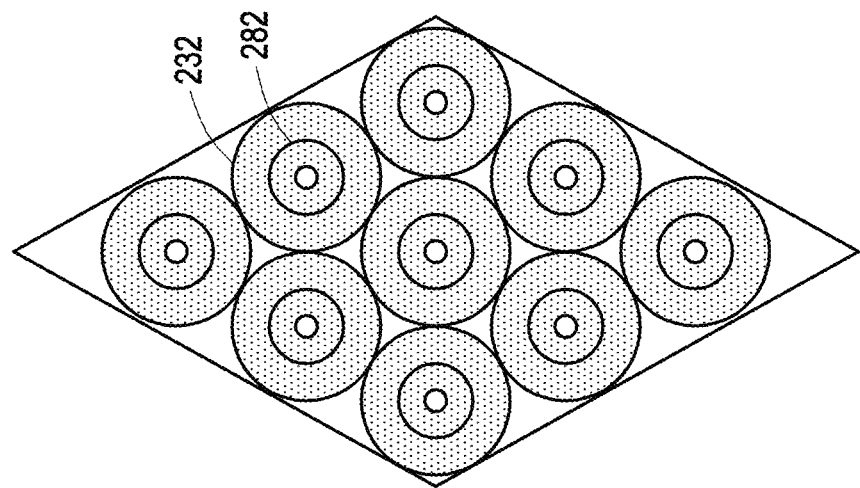
FIG. 12 is a top schematic view of a plurality of first microlenses 232 and a plurality of second microlenses 282 of FIG. 8.

FIG. 12 is a top schematic view of the plurality of first microlenses 232 and the plurality of second microlenses 282 of FIG. 8.

The display apparatus 10B of the third embodiment is similar to the display apparatus 10A of the second embodiment. The second microlens layer 280 of the two embodiments is directly disposed on the first microlens layer 230. The difference between the two is: the relative positions of the plurality of second microlenses 282 of the second microlens layer 280 and the plurality of first microlenses 232 of the first microlens layer 230 are different.

Referring to FIGS. 3 to 7, in the aforementioned second embodiment, the plurality of second microlenses 282 of the second microlens layer 280 are mainly disposed on the gap G1 between the plurality of first microlenses 232 of the first microlens layer 230; the plurality of second microlenses 282 of the second microlens layer 280 and the plurality of first microlenses 232 of the first microlens layer 230 are misaligned.

Referring to FIGS. 8 to 12, in this embodiment, the plurality of second microlenses 282 of the second microlens layer 280 are respectively disposed on the plurality of first microlenses 232 of the first microlens layer 230; the plurality of second microlenses 282 of the second microlens layer 280 and the plurality of first microlenses 232 of the first microlens layer 230 are substantially aligned. Specifically, in this embodiment, each first microlens 232 includes a central portion 232c (marked in FIG. 9) having a vertex 232v (marked in FIG. 9), and the plurality of second microlenses 282 of the second microlens layer 280 respectively overlap the plurality of central portions 232c of the first microlenses 232.

Referring to FIG. 9, in the pixel region 112 (for example: the pixel region 112 on the right side of FIG. 9) to be in a bright state, a portion 1' of the light beam L incident from the second substrate 210 passes through the first microlens 232, and is not totally reflected by the at least one interface I1 between the first microlens 232 and the electrophoresis medium 402. The portion 1' of the light beam L that is not totally reflected by the at least one interface I1 between the first microlens 232 and the electrophoresis medium 402 may be totally reflected by the at least one interface I2 between the second microlens 282 and the electrophoresis medium 402 back to outside the second substrate 210. In this way, the reflectance of the display apparatus 10B may be improved.

In addition, in this embodiment, a width W2 of the second microlens 282 is smaller than a width W1 of the first microlens 232. In this embodiment, the radius of curvature of the second convex surface 282a of the second microlens 282 may be smaller than the radius of curvature of the first convex surface 232a of the first microlens 232. The second convex surface 282a of the second microlens 282 with a smaller radius of curvature may allow a portion l2 of the light beam L that is not totally reflected to be incident on the at least one interface I2 between the second microlens 282 and the electrophoresis medium 402 at a larger incident angle, so as to increase the ratio of total reflection of the light beam L by the at least one interface I2 between the second microlens 282 and the electrophoresis medium 402, thereby further improving the reflectance of the display apparatus 10.

Figure 13:
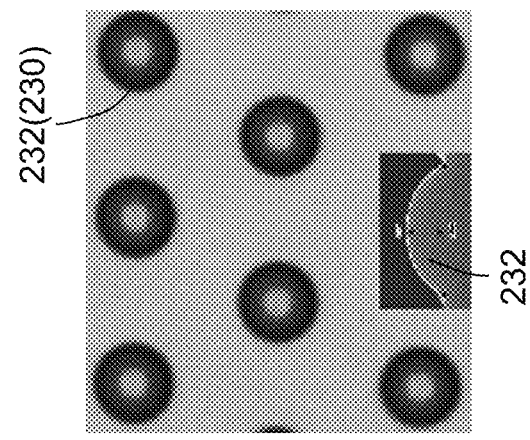
FIG. 13 shows the first microlens 232 according to an embodiment of the disclosure taken with a microscope.

FIG. 13 shows the first microlens 232 according to an embodiment of the disclosure taken with a microscope.

Figure 14:
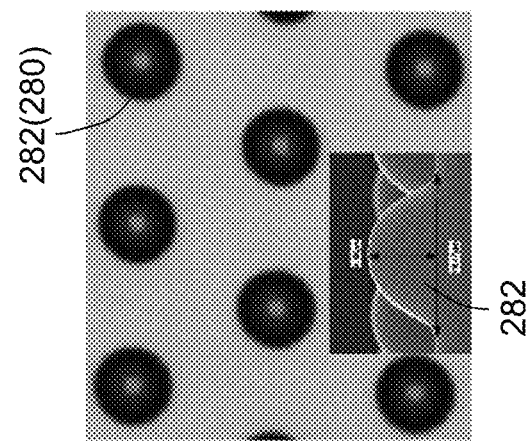
FIG. 14 shows the second microlens 282 according to an embodiment of the disclosure taken with a microscope.

FIG. 14 shows the second microlens 282 according to an embodiment of the disclosure taken with a microscope.

Figure 15:
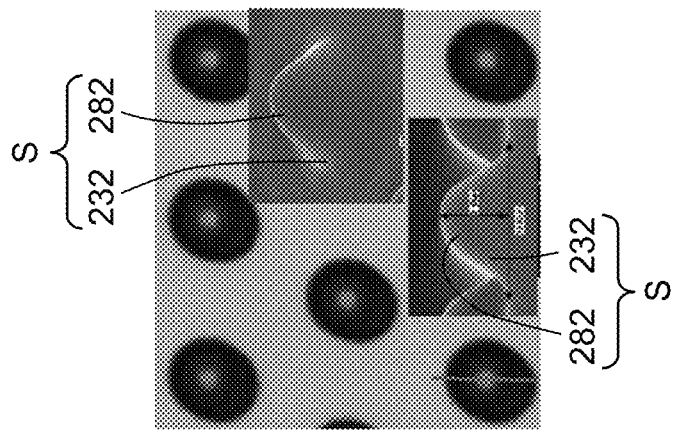
FIG. 15 shows a microlens stack structure S formed by stacking the first microlens 232 and the second microlens 282 according to an embodiment of the disclosure taken with a microscope.

FIG. 15 shows the microlens stack structure S formed by stacking the first microlens 232 and the second microlens 282 according to an embodiment of the disclosure taken with a microscope. The first microlens 232 and the second microlens 282 in FIG. 15 respectively correspond to the first microlens 232 and the second microlens 282 in FIGS. 13 and 14.

Figure 16:
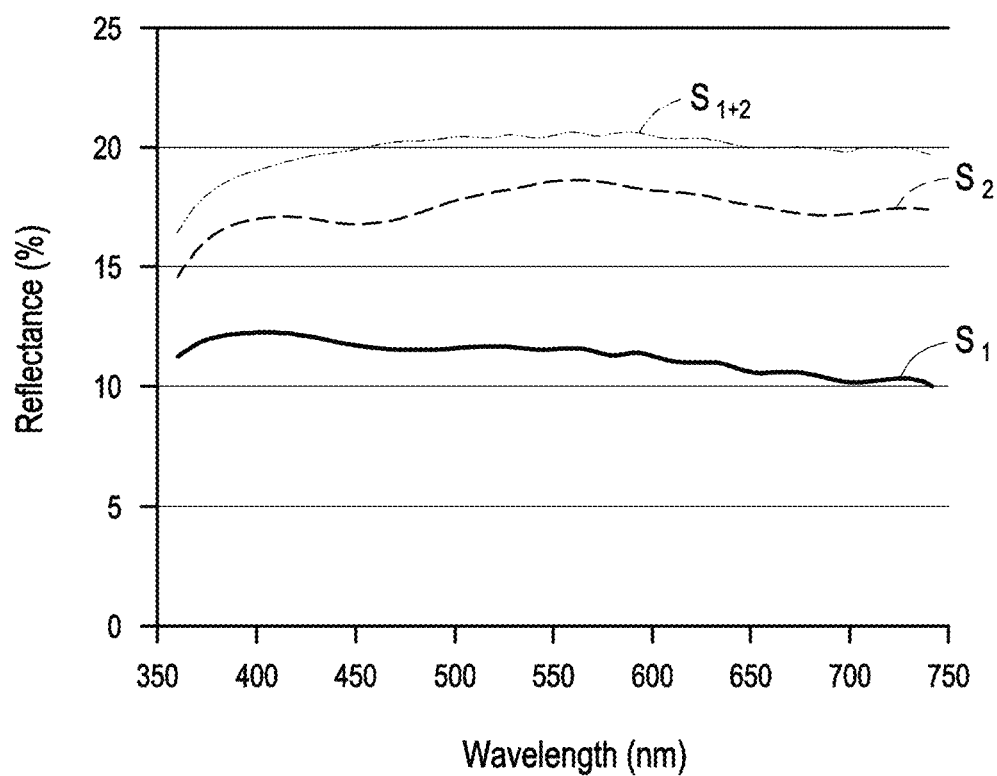
FIG. 16 shows a relation curve $S_1$ between wavelength and reflectance of incident light of a display apparatus according to the first comparative example, a relation curve $S_2$ between wavelength and reflectance of incident light of a display apparatus according to the second comparative example, and a relation $S_{1+2}$ between wavelength and reflectance of incident light of a display apparatus according to an embodiment.

FIG. 16 shows the relation curve $S_1$ between wavelength and reflectance of incident light of a display apparatus according to the first comparative example, the relation curve $S_2$ between wavelength and reflectance of incident light of a display apparatus according to the second comparative example, and the relation $S_{1+2}$ between wavelength and reflectance of incident light of a display apparatus according to an embodiment.

The display apparatus according to the first comparative example corresponding to the relation curve $S_1$ of FIG. 16 is similar to the display apparatus 10B of the aforementioned third embodiment. The difference between the two is: the display apparatus of the first comparative example has the first microlens layer 230 shown in FIG. 13 but does not have the second microlens layer 280.

The display apparatus of the second comparative example corresponding to relation curve $S_2$ of FIG. 16 is similar to the display apparatus 10B of the third embodiment. The difference between the two is: the display apparatus of the second comparative example has the second microlens layer 280 shown in FIG. 14 but does not have the first microlens layer 230.

The display apparatus of an embodiment corresponding to the relation curve $S_{1+2}$ of FIG. 16 is a specific aspect of the display apparatus 10B of the aforementioned fourth embodiment. In particular, the display apparatus of an embodiment corresponding to the relation curve $S_{1+2}$ of FIG. 16 has the microlens stack structure S shown in FIG. 15.

From the relation curves $S_1$, $S_2$, and $S_{1+2}$ of FIG. 16, it can be seen that the reflectance of the display apparatus 10B with the microlens stack structure S shown in FIG. 15 is approximately 9% higher than the reflectance of the display apparatus with the first microlens layer 230 of the first comparative example, and approximately 1.9% higher than the reflectance of the display apparatus with the second microlens layer 280 of the second comparative example.

Figure 17:
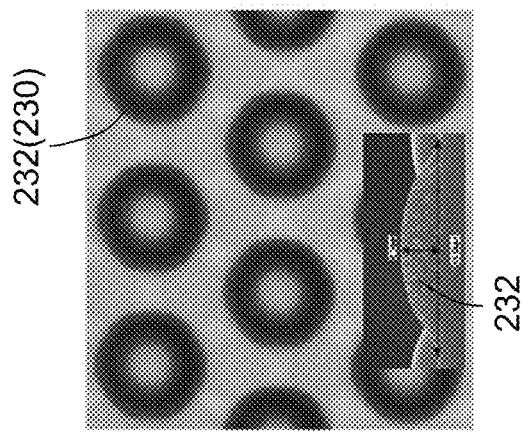
FIG. 17 shows the first microlens 232 according to an embodiment of the disclosure taken with a microscope.

FIG. 17 shows the first microlens 232 according to an embodiment of the disclosure taken with a microscope. The first microlens 232 of FIG. 17 is wider and flatter than the first microlens 232 of FIG. 13.

Figure 18:
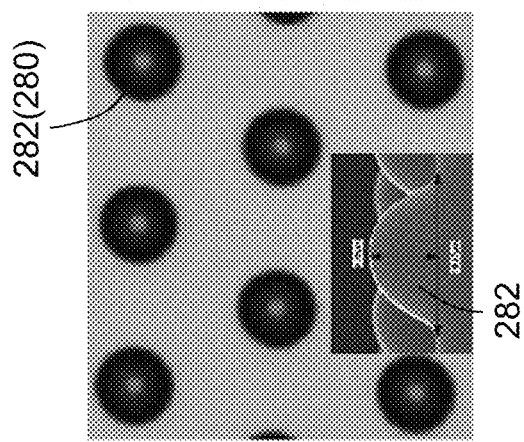
FIG. 18 shows the second microlens 282 according to an embodiment of the disclosure taken with a microscope.

FIG. 18 shows the second microlens 282 according to an embodiment of the disclosure taken with a microscope. The second microlens 282 of FIG. 18 is the same as the second microlens 282 of FIG. 14.

Figure 19:
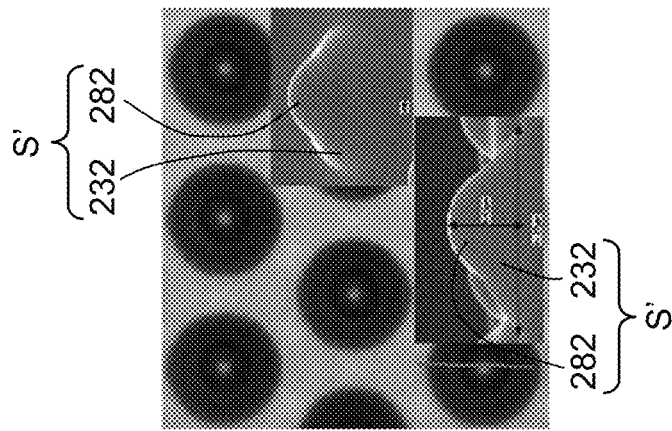
FIG. 19 shows the microlens stack structure S' formed by stacking the first microlens 232 and the second microlens 282 according to an embodiment of the disclosure taken with a microscope.

FIG. 19 shows the microlens stack structure S' formed by stacking the first microlens 232 and the second microlens 282 according to an embodiment of the disclosure taken with a microscope. The first microlens 232 and the second microlens 282 of FIG. 19 respectively correspond to the first microlens 232 and the second microlens 282 of FIGS. 17 and 18.

Figure 20:
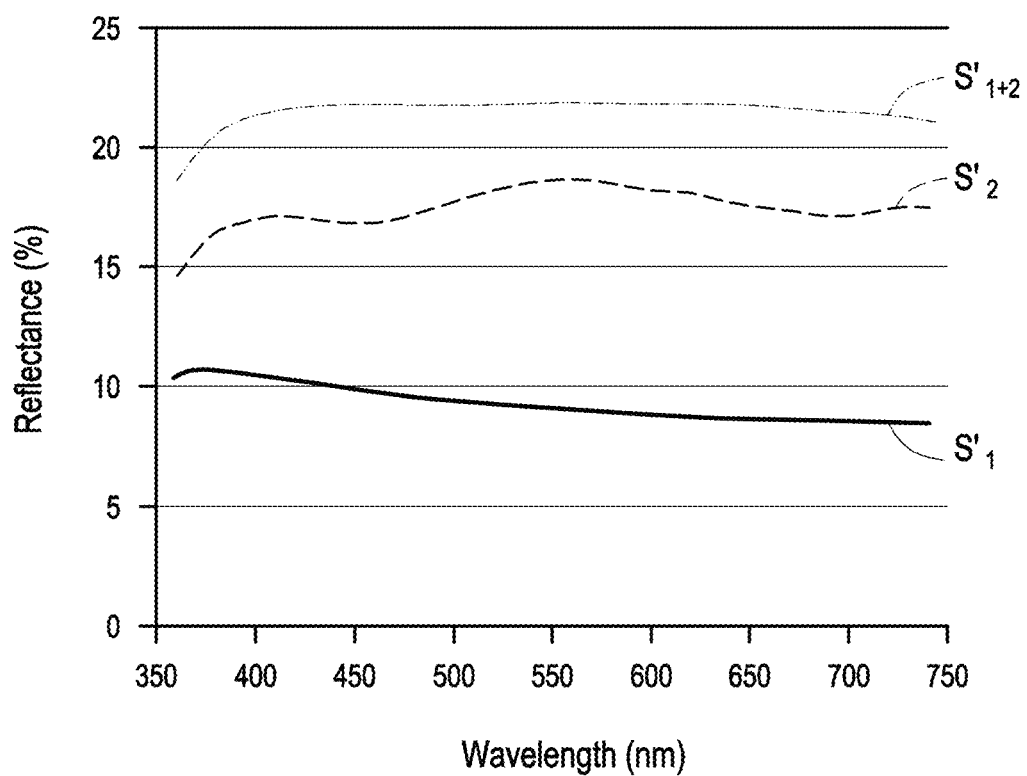
FIG. 20 shows a relation curve $S_1'$ between wavelength and reflectance of incident light of a display apparatus according to the third comparative example, a relation curve $S_2'$ between wavelength and reflectance of incident light of a display apparatus according to the fourth comparative example, and a relation $S_{1+2}'$ between wavelength and reflectance of incident light of the display apparatus according to an embodiment.

FIG. 20 shows a relation curve $S_1'$ between wavelength and reflectance of incident light of a display apparatus according to the third comparative example, a relation curve $S_2'$ between wavelength and reflectance of incident light of a display apparatus according to the fourth comparative example, and a relation $S_{1+2}'$ between wavelength and reflectance of incident light of the display apparatus according to an embodiment.

The display apparatus of the third comparative example corresponding to the relation curve $S_1'$ of FIG. 20 is similar to the display apparatus 10B of the aforementioned third embodiment. The difference between the two is: the display apparatus of the third comparative example has the first microlens layer 230 shown in FIG. 17 but does not have the second microlens layer 280.

The display apparatus of the fourth comparative example corresponding to the relation curve $S_2'$ of FIG. 20 is similar to the display apparatus 10B of the aforementioned third embodiment. The difference between the two is: the display apparatus of the fourth comparative example has the second microlens layer 280 shown in FIG. 18 but does not have the first microlens layer 230.

The display apparatus of an embodiment described in FIG. 20 is another specific aspect of the display apparatus 10B of the aforementioned fourth embodiment. In particular, the display apparatus of an embodiment described in FIG. 20 has the microlens stack structure S' shown in FIG. 19.

From the relation curves $S_1'$, $S_2'$, and $S_{1+2}'$ of FIG. 20, it can be seen that the reflectance of the display apparatus 10B with the microlens stack structure S' of FIG. 19 is approximately 12.8% higher than the reflectance of the display apparatus with the first microlens layer 230 of the third comparative example, and approximately 3.3% higher than the reflectance of the display apparatus with the second microlens layer 280 of the fourth comparative example.

What is claimed is:

1. A display apparatus, comprising:
a first substrate;
a first electrode, disposed on the first substrate;
a second substrate, disposed opposite to the first substrate;
a first microlens layer, disposed on the second substrate, having a plurality of first microlenses;
a second microlens layer, disposed on the first microlens layer, having a plurality of second microlenses;
a second electrode, disposed on the second microlens layer;
a blocking wall structure, at least disposed between the first electrode and the second electrode, having an accommodating space corresponding to the first electrode;
an electrophoresis medium, disposed in the accommodating space, wherein the first microlens layer and the second microlens layer are disposed between the second substrate and at least one portion of the electrophoresis medium; and
a plurality of particles, mixed within the electrophoresis medium;
wherein one of the first microlenses has a first convex surface protruding toward the at least one portion of the electrophoresis medium, one of the second microlenses has a second convex surface protruding toward the at least one portion of the electrophoresis medium, and the first convex surface is located between the second substrate and the second convex surface.

2. The display apparatus according to claim 1, wherein a portion of a light beam passes through the second substrate and the first microlens layer in sequence, is reflected by at least one interface between the second microlens layer and the electrophoresis medium, and passes through the first microlens layer and the second substrate.

3. The display apparatus according to claim 1, wherein one of the second microlenses at least overlaps a first gap between the first microlenses.

4. The display apparatus according to claim 3, wherein one of the first microlenses at least overlaps a second gap between the second microlenses.

5. The display apparatus according to claim 1, further comprising:
a plurality of spacers, disposed on the first microlens layer; and
a porous film, disposed on the spacers, wherein the second microlens layer is disposed on the porous film.

6. The display apparatus according to claim 5, further comprising:
a third electrode, disposed on the first microlens layer;
a first insulating layer, disposed on the third electrode, wherein the spacers are disposed on the first insulating layer; and
a second insulating layer, disposed on the second electrode, wherein the second electrode is located between the second microlens layer and the second insulating layer.

7. The display apparatus according to claim 1, wherein each of the first microlenses comprises a central portion having a vertex; the second microlenses of the second microlens layer respectively overlap the plurality of central portions of the first microlenses.

8. The display apparatus according to claim 1, wherein a radius of curvature of the second convex surface is smaller than a radius of curvature of the first convex surface.

9. The display apparatus according to claim 1, wherein the second microlens layer is directly disposed on the first microlens layer.

10. A display apparatus, comprising:
a first substrate;
a first electrode, disposed on the first substrate;
a second substrate, disposed opposite to the first substrate;
a first microlens layer, disposed on the second substrate, having a plurality of first microlenses;
a second microlens layer, disposed on the first microlens layer, having a plurality of second microlenses;
a second electrode, disposed on the second microlens layer;
a blocking wall structure, at least disposed between the first electrode and the second electrode, having an accommodating space corresponding to the first electrode;
an electrophoresis medium, disposed in the accommodating space, wherein the first microlens layer and the second microlens layer are disposed between the second substrate and at least one portion of the electrophoresis medium;
a plurality of particles, mixed within the electrophoresis medium;
a plurality of spacers, disposed on the first microlens layer;
a porous film, disposed on the spacers, wherein the second microlens layer is disposed on the porous film;
a third electrode, disposed on the first microlens layer;
a first insulating layer, disposed on the third electrode, wherein the spacers are disposed on the first insulating layer; and a second insulating layer, disposed on the second electrode, wherein the second electrode is located between the second microlens layer and the second insulating layer.

11. The display apparatus according to claim 1, wherein one of the first microlenses has a first convex surface protruding toward the first substrate, one of the second microlenses has a second convex surface protruding toward the first substrate, and the first convex surface is located between the second substrate and the second convex surface.

12. The display apparatus according to claim 1, wherein one of the second microlenses at least overlaps a first gap between the first microlenses.

13. The display apparatus according to claim 12, wherein one of the first microlenses at least overlaps a second gap between the second microlenses.

14. A display apparatus, comprising:
a first substrate;
a first electrode, disposed on the first substrate;
a second substrate, disposed opposite to the first substrate;
a first microlens layer, disposed on the second substrate, having a plurality of first microlenses;
a second microlens layer, disposed on the first microlens layer, having a plurality of second microlenses;
a second electrode, disposed on the second microlens layer;
a blocking wall structure, at least disposed between the first electrode and the second electrode, having an accommodating space corresponding to the first electrode;
an electrophoresis medium, disposed in the accommodating space, wherein the first microlens layer and the second microlens layer are disposed between the second substrate and at least one portion of the electrophoresis medium; and
a plurality of particles, mixed within the electrophoresis medium;
wherein a convex surface of one of the second microlenses at least overlaps a first gap between the first microlenses.

* * * * *